(12) United States Patent
Haimzon et al.

(10) Patent No.: US 11,194,733 B2
(45) Date of Patent: Dec. 7, 2021

(54) ACCELERATING ACCESS TO MEMORY BANKS IN A DATA STORAGE SYSTEM

(71) Applicant: Marvell Asia Pte Ltd., Singapore (SG)

(72) Inventors: Avi Haimzon, Nes Ziona (IL); Adi Katz, Ramat Gan (IL)

(73) Assignee: Marvell Asia Pte, Ltd., Singapore (SG)

( * ) Notice: Subject to any disclaimer, the term of this patent is extended or adjusted under 35 U.S.C. 154(b) by 0 days.

(21) Appl. No.: 16/800,913

(22) Filed: Feb. 25, 2020

(65) Prior Publication Data

US 2020/0272576 A1 Aug. 27, 2020

Related U.S. Application Data

(60) Provisional application No. 62/810,227, filed on Feb. 25, 2019.

(51) Int. Cl.
| | |
|---|---|
| *G06F 12/10* | (2016.01) |
| *G06F 12/1009* | (2016.01) |
| *G06F 9/30* | (2018.01) |
| *G06F 12/02* | (2006.01) |
| *G06F 12/1036* | (2016.01) |
| *G06F 13/16* | (2006.01) |

(52) U.S. Cl.
CPC ...... *G06F 12/1009* (2013.01); *G06F 9/30029* (2013.01); *G06F 12/0292* (2013.01); *G06F 12/1036* (2013.01); *G06F 13/1615* (2013.01); *G06F 13/1657* (2013.01); *G06F 2212/657* (2013.01); *G06F 2212/7201* (2013.01)

(58) Field of Classification Search
CPC ............. G06F 12/1009; G06F 12/1036; G06F 2212/7201; G06F 2212/657; G06F 12/0292; G06F 13/1657; G06F 9/30029; G06F 13/1615
USPC ........................................................ 711/206
See application file for complete search history.

(56) References Cited

U.S. PATENT DOCUMENTS

| | | | |
|---|---|---|---|
| 9,063,841 B1 | 6/2015 | Valency et al. | |
| 9,658,951 B1 | 5/2017 | Shumsky et al. | |
| 9,996,468 B1 | 6/2018 | Shumsky et al. | |
| 10,678,724 B1* | 6/2020 | ChoFleming | ....... H04L 67/1097 |
| 2011/0022791 A1* | 1/2011 | Iyer | ........................ G06F 3/0652 |
| | | | 711/105 |
| 2018/0018095 A1* | 1/2018 | Lee | ........................ G06F 3/0619 |

* cited by examiner

*Primary Examiner* — Hua J Song

(57) ABSTRACT

A first master receives a first virtual address in a virtual memory, the first virtual address in the virtual memory corresponding, according to a mapping function, to a first physical address of a first physical memory bank which is to be accessed by the first master. The first master accesses the first physical address to perform a first memory operation in the first memory bank. A second master receives a second virtual address in a virtual memory, the second virtual address in the virtual memory corresponding, according to the mapping function, to a second physical address of a second physical memory bank which is to be accessed by the second master. Concurrently with access by the first master to the first physical address, the second master accesses the second physical address to perform a second memory operation in the second physical memory bank.

24 Claims, 4 Drawing Sheets

ACCELERATING ACCESS TO MEMORY BANKS IN A DATA STORAGE SYSTEM

CROSS REFERENCE TO RELATED APPLICATION

This disclosure claims the benefit of priority of U.S. Provisional Application Ser. No. 62/810,227 filed Feb. 25, 2019 entitled, "METHOD AND APPARATUS FOR ACCELERATING MEMORY ACCESS", the contents of which is incorporated herein by reference in its entirety.

FIELD OF USE

This disclosure relates to a data storage system, namely accelerating access to memory banks in the data storage system to improve throughput of the data storage system and/or to reduce latency of access to the data storage system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A data storage system facilitates storage and retrieval of data in volatile or non-volatile memory. Read and write performance of the data storage system is measured in terms of throughput and latency. Throughput defines a rate at which data is read or written to the data storage system and latency is a delay in accessing data from the data storage system. Conventional solutions for increasing the throughput and decreasing the latency of the data storage system typically result in a material increase in power consumption of the data storage system and cost of the data storage system.

SUMMARY

This disclosure relates to a data storage system, namely accelerating access to memory banks in the data storage system to improve throughput of the data storage system and/or to reduce latency of access to the storage system.

Aspects of the disclosure provide a method for improving memory access in a data storage system, the method comprising: receiving, at a first master, a first virtual address in a virtual memory, the first virtual address in the virtual memory corresponding, according to a mapping function, to a first physical address of a first physical memory bank which is to be accessed by the first master; accessing, by the first master, the first physical address to perform a first read operation to read a first portion of a data unit stored in the first physical memory bank at the first physical address, or to perform a first write operation to write the first portion of the data unit to the first physical memory bank at the first physical address; receiving, at a second master, a second virtual address in a virtual memory, the second virtual address in the virtual memory corresponding, according to the mapping function, to a second physical address of a second physical memory bank which is to be accessed by the second master; and concurrently with access by the first master to the first physical address, accessing, by the second master, the second physical address to perform a second read operation to read a second portion of the data unit stored in the second physical memory bank at the second physical address, or to perform a second write operation to write the second portion of the data unit to the second physical memory bank at the second physical address.

In one example, the mapping function maps the first virtual address in the virtual memory associated with the first portion of the data unit to the first physical address in the first physical memory bank associated with the first portion of the data unit and the second virtual address in the virtual memory associated with the second portion of the data unit to the second physical address in the second physical memory bank associated with the second portion of the data unit. In another example the first virtual address in the virtual memory associated with the first portion of the data unit and the second virtual address in the virtual memory associated with the second portion of the data unit are associated with consecutive rows in the virtual memory and the first physical address in the first physical memory bank and the first physical address in the second physical memory bank identify consecutive memory banks. In yet another example, the mapping function maps the first virtual address in the virtual memory associated with the first portion of the data unit to the first physical address based on an a logical exclusive OR (XOR) operation on bits of the first virtual address in the virtual memory associated with the first portion of the data unit, an output of the logical XOR operation identifying the first physical memory bank associated with the first portion of the data unit. In another example, the data unit is 32 bytes, the first virtual address in the virtual memory associated with the first portion of the data unit is 23 bits represented by a variable Address where bit 22 is a most significant bit and bit 0 is a least significant bit, and the logical XOR operation is bits 12 to 9 of the Address XORed with bits 8 to 5 of the Address to identify the first physical memory bank associated with the first portion of the data unit. In yet another example, the first master accesses a portion of the first physical memory bank based on the first physical address or the second master accesses a portion of the second physical memory bank based on the second physical address. In another example, the first physical memory bank and the second physical memory bank are a same memory bank, the method further comprising arbitrating access by the first master and the second master to the first physical memory bank and the second physical memory bank. In yet another example, the first physical memory bank and the second physical memory bank are each single port memory banks. In another example, the mapping function is a mapping table which maps virtual addresses of the virtual memory to physical addresses of physical memory banks, the mapping table shared by the first master and the second master. In yet another example, the concurrent access by the first master and the second master is within a clock cycle.

Aspects of the disclosure provide a storage system comprising: a first memory bank; a second memory bank; a first master configured to: receive a first virtual address in a virtual memory, the first virtual address in the virtual memory corresponding, according to a mapping function, to a first physical address of a first physical memory bank which is to be accessed by the first master; access the first physical address to perform a first read operation to read a first portion of a data unit stored in the first physical memory bank at the first physical address, or to perform a first write operation to write the first portion of the data unit to the first physical memory bank at the first physical address; a second master configured to: receive a second virtual address in a virtual memory, the second virtual address in the virtual memory corresponding, according to the mapping function, to a second physical address of a second physical memory bank which is to be accessed by the second master; concurrently with access by the first master to the first physical address, access the second physical address to perform a second read operation to read a second portion of the data unit stored in the second physical memory bank at the second physical address, or to perform a second write operation to write the second portion of the data unit to the second physical memory bank at the second physical address.

Figure 1:
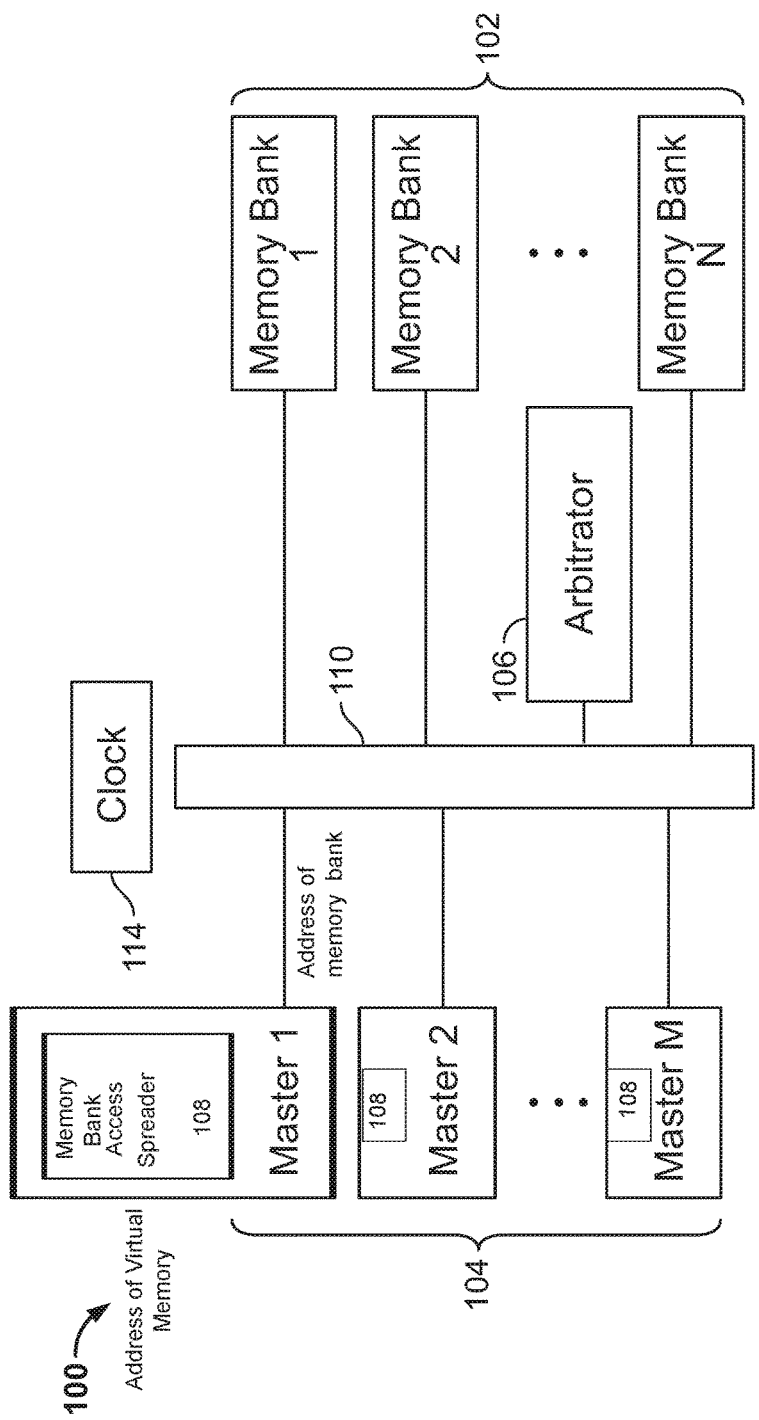
FIG. 1 illustrates an example storage system which spreads accesses by masters to memory banks.

The drawings are for the purpose of illustrating example embodiments, but it is understood that the embodiments are not limited to the arrangements and instrumentality shown in the drawings.

DETAILED DESCRIPTION

This disclosure relates to data storage systems having a plurality of masters and a plurality of memory banks and improving access by the plurality of masters to the plurality of memory banks. The memory banks store data and facilitate retrieval of stored data. Further, in an embodiment, the memory banks are single port memory banks which only allow one master to access the memory bank in a given period of time. Memory accesses are spread among the plurality of physical memory banks to increase the probability of each master being able to successfully access a memory bank while avoiding collision with concurrent access by another master in the given period of time. By enabling a plurality of different masters to concurrently access the memory banks with a reduced probability of collision, throughput of the storage system is increased and latency of the storage system is reduced. In some examples, specifically when the single port memory bank is used, the benefits of an increased rate of memory bank access and reduced latency are achieved while maintaining low power consumption and reduced cost of the data storage system.

Overview

A data storage system has a plurality of masters and a plurality of memory banks. The plurality of masters seek to access the plurality of memory banks to perform read or write operations in the plurality of memory banks. Each physical memory bank is a single port memory which allows access by one master in a period of time such as a clock cycle.

In some examples, two or more masters want to access a same memory bank in the period of time. So that each master is able to access the same bank, the data storage has an arbitrator to fairly arbitrates access. The arbitrator grants master 1 access, followed by master 2 in another period of time, and then master 3 in yet another period of time etc. Further, each master may access a maximum number of bytes of data in a memory bank known as a burst of data. For example, if the period of time is a clock cycle, master 1 accesses up to 64 bytes of data at a time over 2 consecutive clock cycles as a burst. As another example, master 2 accesses up 512 bytes of data at a time over 16 consecutive clock cycles as a burst. As yet another example, master 3 accesses up to 1024 bytes of data at a time over 32 consecutive clock cycles as a burst. The burst access allows for efficiently accessing the data in the memory bank, but if data in a same memory bank is to be accessed by a two or more masters, all but one master will need to wait until another master completes its burst access. To increase throughput and reduce latency of the data storage system, a width of a data path to the data storage system is conventionally increased so that more bits or bytes are carried by the data path at a time or a clock rate of a clock that provides timing to the storage system is conventionally increased so that increased data is read from or written to the memory banks over time. Both increasing the width of the data path and increasing the clock rate increases cost of the data storage system and results the storage system consuming more power.

Systems, apparatus, methods and techniques are described to improve access to the plurality of memory banks by spreading the access by the plurality of masters among the memory banks. The masters access the plurality of memory banks based on a virtual memory of the memory banks. The virtual memory has a plurality of addresses where an address in the virtual memory of the memory banks is associated with a respective portion of data which is to be read from a memory bank or stored in the memory bank. For example, a first address in the virtual memory is associated with a first portion of data and a second address in the virtual memory is associated with a second portion of data. In an embodiment, the memory banks are single port memory banks which allow access by one master in a period of time such as the clock cycle. The masters use the addresses in the virtual memory of the memory banks associated with portions of data to access the memory banks which are physical memory banks to read the portions of data from the memory banks and write the portions of data to the memory banks. For example, a first master of the plurality of masters determines an address in the first memory bank to store the first portion of data in the first memory bank or to retrieve the first portion of data from the first memory bank in a period of time based on a mapping between the first address and the address in the first memory bank. The first master then accesses the address in the first memory bank. As another example, a second master of the plurality of masters determines an address in the second memory bank to store the second portion of data in the second memory bank or to retrieve the second portion of data from the second memory bank in the period of time based on a mapping between the first address in the virtual memory and the address in the first memory bank. The second master then accesses the address in the second memory bank. The mapping spreads the accesses to different memory banks for different portions of data so that each master will be able to successfully access the memory bank with increased probability without collision with another master in a period of time, thereby increasing throughput and reducing latency of the storage system.

The description that follows includes example systems, apparatuses, and methods that embody aspects of the disclosure. However, it is noted that this disclosure may be practiced without these specific details. In other instances, well-known instruction instances, structures and techniques have not been shown in detail in order not to obfuscate the description.

Example System

FIG. 1 illustrates a block diagram of an example storage system 100 which facilitates storage and retrieval of data in volatile or non-volatile memory. In examples, the storage system 100 may be part of a larger system such as a computing system, a networking device, or a storage enclosure or specifically personal computers, servers, mainframes, smartphones, gaming systems, set top boxes, communication equipment, etc. In this regard, the data may take many forms, including but not limited to data packets, code, or data structures, depending on a nature of the larger system. The storage system 100 includes a plurality of memory banks 102 shown as 1 . . . N, a plurality of masters 104 shown as 1 . . . M, and an arbitrator 106. The plurality of memory banks 102, the plurality of masters 104, and the arbitrator 106 may be communicatively coupled together by a bus 110. The bus 110 may be compliant with Peripheral Component Interconnect (PCI), Industry Standard Architecture (ISA), PCI-Express, New Bus (NuBus), Advanced Extensible Bus AXI Bus, or Ethernet standards, among other standards.

A memory bank shown as one of the plurality of memory banks 102 is a unit of electronic data storage containing multiple memory locations implemented in one or more semiconductor memory chips such random access memory (RAM), synchronous RAM (SRAM), dynamic RAM (DRAM), zero capacitor RAM, Twin Transistor RAM, embedded DRAM (eDRAM), extended data output RAM (EDO RAM), double data rate RAM (DDR RAM), and flash memory or in one or more storage drives such as a solid state drive, a hard drive, and the like. Although each memory bank is depicted as a single block, in some configurations, a memory bank is comprised of a plurality of different physical memories. The memory banks may be each separate on-die memory banks within a same integrated circuit or disposed on different solid state devices or different integrated circuits.

In examples, the memory locations may be organized as rows in the memory bank. For example, a memory bank may have 16384 rows with 32 memory locations per row where each memory location stores a byte of data. Each memory location may be associated with a memory address which uniquely identifies the memory location in the memory bank. Each row may be associated with a row number or a memory address that uniquely identifies the row such as a first byte or last byte of a memory location in the row. The storage system 100 is shown to have N memory banks identified as one of memory bank 1 to memory bank N, as an example. In some examples, N=16. The storage system 100 may have more or less memory banks in other examples. Further, each memory bank of the plurality of memory banks 102 may have a same number of memory locations or different number of memory locations. Further, each memory bank may be further associated with a non-overlapping range of addresses, so that each memory location and rows in each memory bank is uniquely identifiable over the plurality of memory banks 102. Each memory bank may be independently accessible in parallel, but not accessible by two or more masters at a same time as described below. In examples, each memory bank may be a single port memory which allows for access by one master at a time. Further, in an embodiment, a portion of a memory bank may be accessible via a single access channel (or port) providing access by a single master to a corresponding portion of the memory bank.

Each master of the plurality of masters 104 is an integrated circuit which performs read access or write access of a memory bank. In some examples, the plurality of masters 104 and the plurality of memory banks may be disposed on the same integrated circuit (IC) or solid-state device. In other examples, the plurality of memory banks 102 and the plurality of masters 104 may be disposed on multiple integrated circuits or multiple other suitable solid-state devices.

The storage system 100 is shown to have M masters identified as master 1 to master M. While in some examples, M=6, in other examples, there are a greater or lesser number of masters. A master may access a memory bank. To facilitate this read access and write access, the bus 110 which facilitates communication between the plurality of masters 104 and the plurality of memory banks 102 defines one or more of a control path, an address path, and a data path. The control path indicates whether data is to be written to the memory locations or data is to be read from the memory locations. The address path carries memory addresses indicative of the memory locations to be read or written to. The data path carries the data which is to be stored in the memory locations or the data to be read from the memory locations. The master asserts one or more signals on the control path to indicate the read or write operation, one or more signals on the address path to indicate the data to access, or one or more signals on the data path to indicate the data to be written. In examples the signal may be a voltage level applied to the control path or the address path. To illustrate, the master may specify a read or write operation on the control line by placing a high (or low) voltage signal on the control path. The master then specifies a memory location in the memory bank to access by applying one or more signals indicative of a unique memory address on the address path which identifies the memory location. For a write access, the master applies one or more signals indicative of the data to be stored to the data path which results in the data being stored in the identified memory location. For a read access, the memory bank may apply one or more signals on the data path indicative of the data which is retrieved from the identified memory location in the memory bank and provided to the master. Other variations are also possible.

The storage system 100 may have a clock 114. The clock 114 is configured to generate a periodic signal referenced by the plurality of masters 104 and which defines periods of time or clock cycles when a master attempts to access a memory bank. Specifically, the storage system 100 may be arranged so that for each clock cycle, one or more masters may attempt to access a memory bank of the plurality of memory banks 102. For example, a master may access data in a row of a memory bank such as 32 bytes of data. Further, each master may be able to access a maximum amount of data in a memory bank or memory banks at a time as a burst of contiguous data. For example, master 1 may have access up to 64 bytes of data at a time in 2 clock cycles. As another example, master 2 may have access up to 512 bytes at a time in 16 clock cycles. As yet another example, master 3 may access up to 1024 bytes of data at a time in 32 clock cycles. The maximum access allows for efficient access of data in a memory bank.

A memory bank provides access to only one master in a clock cycle. If two or more masters attempt to access a same memory bank or portion of a same memory bank such as a memory bank 1 in a same clock cycle via a single access port or channel, then a collision occurs and neither is granted access without further intervention. The arbitrator 106 may be an integrated circuit which intercepts access to one or more memory banks by the two or more masters, detects whether the access by the two or more masters is to the same memory bank and will result in a collision, and arbitrates access by two or more masters to a same memory bank. If two or more masters seek to access a same memory bank in a clock cycle, the arbitrator 106 may fairly provide access to the same memory bank to the two or more masters. The fair access may allow each master to complete its memory operations so that each master is able to meet individual throughput and latency criteria. For example, the arbitrator may permit a first master access in a first clock cycle and then permit a second master in a second clock cycle by alternating access between the two competing masters according to an access scheme such as round robin, weighted round robin and the like. This way each master may be able to timely access the same memory bank. Otherwise, if data in a same memory bank is accessed by two masters, one master may need to wait up to the number of clock cycles associated with a maximum access by the other master before being able to access the same memory bank.

The memory banks 102 is physical memory, in an embodiment. The masters access the plurality of memory banks based on a virtual memory of the memory banks. The virtual memory has one or more addresses associated with data which may be a frame, packet, chunk, or other suitable data unit, as examples. The data may be associated with a single address in the virtual memory. Alternatively, the data is divided into portions of data and an address in the virtual memory of the memory banks is associated with a respective portion of data. Further, the plurality of portions of data may be consecutive addresses of virtual memory. For example, a first address in the virtual memory is associated with a first portion of data and a second address in the virtual memory is associated with a second portion of data. In examples, each address in the virtual memory is mapped to an address in a memory bank. The mapping determines the memory bank to store the respective portion of data or the memory bank from where to retrieve the respective portion of data. Each master 104 may have a respective memory bank access spreader ("access spreader") 120 to perform the mapping. The access spreader 108 is an integrated circuit configured to map the virtual address in the virtual memory to the physical address in a memory bank. The mapping results in accesses by the masters to the memory banks 102 such as a read or write for different portions of data being spread to different physical memory banks so that each master will be able to successfully access a memory bank with increased probability without collision with another master in the period of time, thereby increasing throughput and reducing latency of the storage system in some examples.

To illustrate, two masters may seek to read different portions of data associated with different address in the virtual memory in a clock cycle or write different portions of data associated with different addresses in the virtual memory. A first portion of data may be associated with a first address in the virtual memory and a second portion of data may be associated with a second address in the virtual memory. The access spreader associated with a first master may map the first address in the virtual memory to an address in a first memory bank and the one master may access the first memory bank. The access spreader associated with a second master may map the second address in the virtual memory to an address in a second memory bank and the second master may access the second memory bank in the same clock cycle. The mapping function may map the addresses of the virtual memory to the addresses of the memory banks so that each master will be able to successfully access a memory bank for the read or write operation and the arbitrator 106 may not need to arbitrate access to a same memory bank as often.

Based on the access spreader spreading accesses by masters over different memory banks, a successful access by a master in a clock cycle (i.e., another master is not also trying to access the same memory bank at a same time) has a probability of 85.6% in the example storage system 100 with M=6 and N=16. The probability of 85.6% is calculated based on a probability that a memory bank is accessed is ⅙ and a probability that no bank is accessed is given by $(1-⅙)^6=0.679$. Then, the probability that any of the plurality of memory banks 102 may be accessed is given by 1−0.679=0.321 and a probability that a master will successfully access a memory bank is given by 0.321*¹⁶⁄₆=0.856 or 85.6%. The probability of successful access indicates that if access by a master to the plurality of memory banks 102 is uniformly distributed over clock cycles and access to a memory bank by each of the masters is independent, then the probability that a master may successfully access a memory bank without collision with another master is close to one. This probability may be increased or decreased based on a number of memory banks N and/or a number of masters M. Because the spreading of access the masters are uniform over the memory banks in some examples, throughput of the data storage system 100 is increased and latency of the data storage system 100 is reduced.

Figure 2:
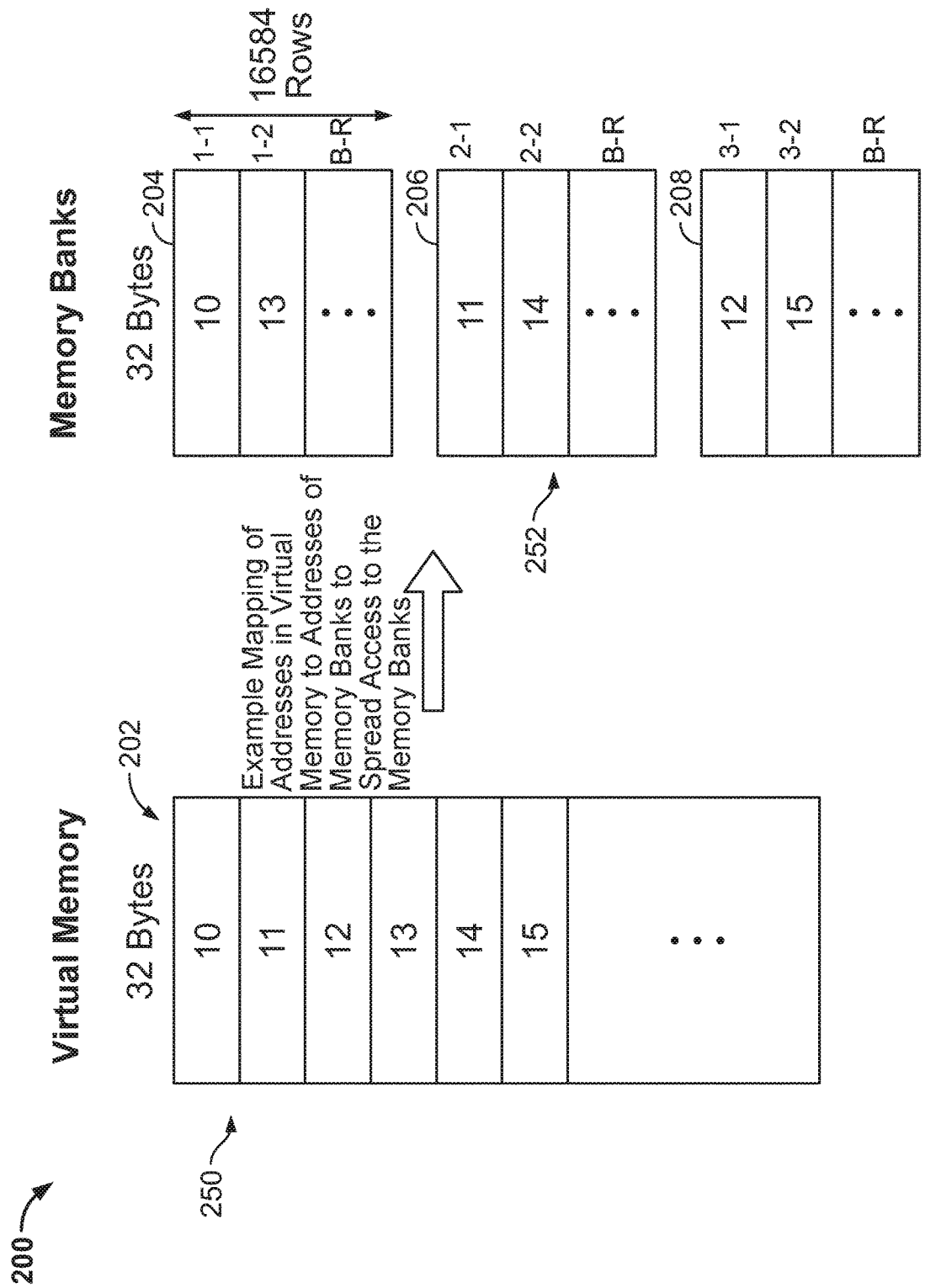
FIG. 2 illustrates an example mapping of addresses in a virtual memory to addresses of the memory banks to spread accesses by the masters to the memory banks in the example storage system.

FIG. 2 illustrates an example process 200 of spreading access of the masters to memory banks 204, 206, 208 performed by the access spreader 108. The access spreader 108 may spread access to three memory banks 204, 206, 208 based on addresses in a virtual memory 202 provided by the masters. The virtual memory 202 may define a memory address space with a start and an end memory address in a single linear address space. The virtual memory 202 may have a plurality of rows, an example of which is shown as row 250. In examples, each row may correspond to 32 bytes of data or a portion of data to read or write. The memory banks 204, 206, 208 may be also arranged with rows, an example of which is shown as row 252. The row 252 may also correspond to 32 bytes of data, but in other examples the row 250 and the row 252 may correspond to different sizes. Each memory bank and each row in the memory bank may be addressable and each memory bank may have a plurality of rows which is in this example is shown as 16584 rows and memory banks 204, 206, 208 may collectively define a page of storage. The access spreader 108 may define a mapping function which performs a mapping of an address associated with an address in the virtual memory to an address in a memory bank which in examples is a one-to-one mapping.

The mapping function may indicate that addresses of consecutive rows in the virtual memory 202 are mapped to addresses of consecutive memory banks. In examples, a plurality of consecutive rows may represent data, and the addresses of the consecutive rows may be associated with the portions of data. The memory banks may be consecutive when an address range increases (or decreases) for each subsequent memory bank. To illustrate, labels 10-15 are addresses of rows of the virtual memory 202. The addresses of the rows in the virtual memory 202 are mapped to addresses of the memory banks which each uniquely identifies a memory bank and a row in the memory bank. For instance, address 10 in the virtual memory 202 may be mapped to an address in the memory banks associated with the illustrated row in memory bank 204, address 11 in the virtual memory 202 may mapped to an address in the memory banks associated with the illustrated row in memory bank 206, and address 12 in the virtual memory 202 may mapped to an address in the memory banks associated with the illustrated row in memory bank 208. The addresses in the memory banks are represented by B-R where B is a variable indicating a memory bank and R is a row of the memory bank, and as shown 1-1 corresponds to the address of row 1 in memory bank 1, 1-2 corresponds to the address of row 2 in bank 1, and 2-2 corresponds to the address of row 1 in memory bank 2, etc. Because there are three memory banks in this example, additional addresses in the virtual memory 202 may be mapped to the same memory banks. To illustrate, address 13, address 14, and address 15, all associated with the virtual memory 202, may be mapped to an address in the memory banks associated with another row in memory bank 204, 206, 208, respectively, based on the mapping function. The mapping function may be a hash function which provides the one-to-one mapping between an address in virtual memory and an address in a memory bank. The mapping function may map the addresses of the virtual memory to the addresses of the memory banks so that each master will be able to successfully access a memory bank for the read or write operation.

In another example, the access spreader 108 may indicate that addresses in the virtual memory 202 are mapped to memory banks based on bits of the addresses in the virtual memory 202. To illustrate, consider that an address in the virtual memory 202 is represented by a variable Address. The variable Address may be 23 bits, for example, and represented as Address[22:0] which is a shorthand notation to identify values of the bits 22 to 0 where bit 22 is a most significant bit and 0 is a least significant bit. Address[22:0] may be an address which uniquely identifies a byte in the virtual memory 202. Address[22:5] may indicate values of bits 22 to 5 of the Address and Address[4:0] may indicate values of bits 4 to 0 of the Address. A row in the virtual memory 202 which may be 32 bytes is uniquely identified by Address[22:5] and Address [4:0] uniquely addresses bytes of the row. The access spreader 108 may map an address in the virtual memory 202 to an address of a memory bank based on a logical operation. Address[8:5] which indicates bits 8 to 5 of the Address correspond to four bits representing one of 16 values. Address[12:9] which indicates bits 12 to 9 of the Address may be upper bits. The logical operation may be:

Address[12:9]XOR Address[8:5]

which is a logical exclusive or (XOR) operation of two 4 bit numbers to produce a pattern of four bits indicative of one of the 16 memory banks associated with the Address. The Address may be mapped to the address of the indicated memory bank. Address[22:9] then indicates the address of the row in the identified memory bank and Address[4:0] indicates the bytes in the row. The XOR operation results in rows in virtual memory having same Address[8:5] being mapped to different memory banks in different pages. The XOR operation maps the addresses of the virtual memory to the addresses of the memory banks so that each master will be able to successfully access a memory bank for the read or write operation.

Example Functions

Figure 3:
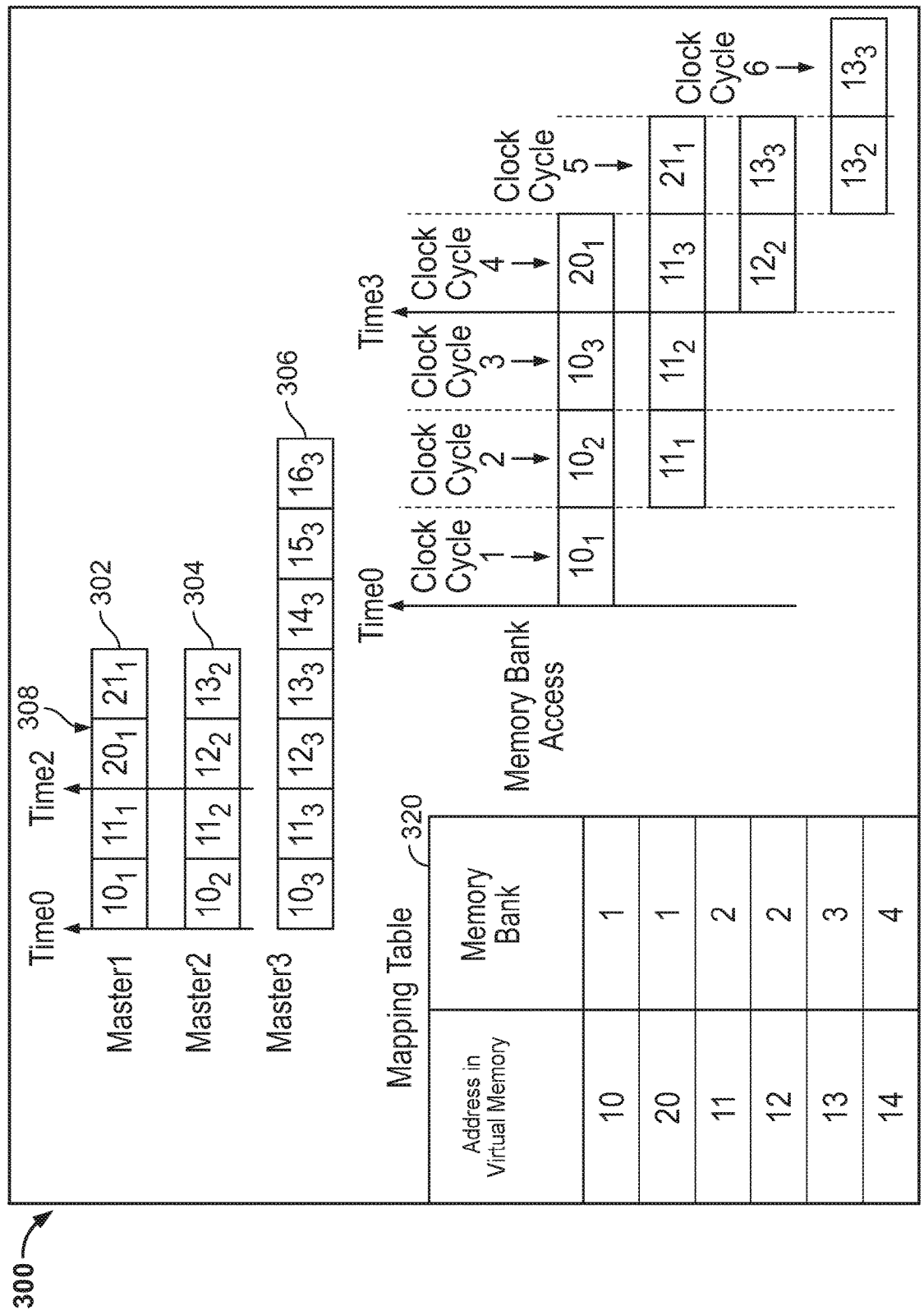
FIG. 3 illustrates example accesses by the masters to the memory banks based on mapping addresses in the virtual memory to addresses of the memory banks in the example storage system.

FIG. 3 illustrates example accesses of the plurality of memory banks 102 by a plurality of masters 104. Master 1, Master 2, and Master 3 may each access a portion of data based on an address of the virtual memory associated with the portion of data. The mapping function indicates a mapping between addresses in the virtual memory associated with a portion of data and addresses in the memory bank where the portions of data are stored or could be written to. The mapping function is represented as a mapping table 320 in this example. The mapping table 320 spreads accesses by the plurality of masters over the plurality of memory banks 102 in the data storage system 100. The addresses of virtual memory associated with portions of data which the masters seek to access are shown as 302, 304, 306 for Master 1, Master 2, and Master 3 respectively. For example, Master 1 may seek to access portions of data associated with addresses 10, 11, 20, and 21 in the virtual memory, Master 2 may seek to access portions of data associated with addresses 10, 11, 12, and 13 in the virtual memory, and Master 3 may seek to access portions of data associated with addresses 10, 11, 12, 13, 14, 15, and 16 in the virtual memory. The addresses ranging from 10-21 may be mapped to addresses of memory banks. In this example, addresses N and N+10 may be in a same memory bank in this example. To illustrate, address 10 and 20 may be in a same memory bank while address 11 and 12 may be in different memory banks in this example. A master number in a lower right corner of the block 308 (e.g., 1, 2, or 3) may further indicate which master (e.g., master 1, master 2, or master 3) seek to access portions of data in the memory banks associated with addresses. The arbitrator 106 may further arbitrate when two or more masters attempt to access a same memory bank at a same period of time such as a same clock cycle. In the event of a collision, the arbitrator 106 may allow for the first master to access one memory bank and then provide access to the second master and then any additional masters who are to access the memory bank. In this example, Master 1 may have a maximum access of 2 blocks while Master 2 and Master 3 may have maximum access of 16 blocks and 32 blocks respectively.

In examples, a master may use the mapping table 320 to map the virtual address in virtual memory associated with the portion of data to a physical address in a memory bank. The portion of data may be a chunk of data, a portion of a packet, or some other portion of a data unit which is to be read from a memory bank or stored in a memory bank as part of a memory operation. Based on the mapped address of the memory bank, the master may then read the portion of data in the memory bank or write a portion of data to the memory bank. For instance, virtual address 10 in the virtual memory 202 may map to a physical address in memory bank 1. As another example, virtual address 11 in the virtual memory 202 may map to a physical address in memory bank 2. Then, a master may access the mapped address in a memory bank to perform the memory operation, e.g., read or write, associated with the portion of data in the memory bank.

As shown, in clock cycle 1, Master 1, Master 2, and Master 3 attempt to access the portion of data associated with virtual address 10 in virtual memory. The masters may be attempting to access a same physical memory bank based on the mapping table 320. The arbitrator 106 may allow master 1 to access the physical memory bank. Master 2 and Master 3 may be denied access because each physical memory bank allows access to one master in a dock cycle.

As shown, in clock cycle 2, the arbitrator allows Master 2 to access the portion of data associated with virtual address 10 in virtual memory. Master 1 may want to access the portion of data associated with virtual address 11 which is in a different memory bank from the portion of data associated with virtual address 10 based on the mapping table 120. Access to the portion of data associated with virtual address 11 is permitted because the portion of data associated with virtual address 10 and the portion of data associated with virtual address 11 are in different physical memory banks based on the mapping table 320. Master 3 cannot access the portion of data associated with virtual address 10 because Master 2 is permitted access in the clock cycle by the arbitrator.

As shown, at clock cycle 3, the arbitrator allows Master 3 to access the portion of data associated with virtual address 10. Master 2 is allowed access to the portion of data associated with virtual address 11 which is in a different physical memory bank from the portion of data associated with virtual address 10 based on the mapping table 320. Master 1 is not allowed access to the portion of data associated with virtual address 10 because it has already performed a maximum access of two blocks which is its maximum burst access length.

As shown, at clock cycle 4, Master 1 accesses the portion of data associated with virtual address 20. Master 3 accesses the portion of data associated with virtual address 11 which is in a different physical memory bank from the portion of data associated with virtual address 20 based on the mapping table 320. Master 2 accesses the portion of data associated with virtual address 12 because it is not in the same physical memory bank as the portion of data associated with virtual address 20 or the portion of data associated with virtual address 11 based on the mapping table 320.

As shown, at clock cycle 5, Master 1 accesses the portion of data associated with virtual address 21. Master 3 accesses the portion of data associated with virtual address 12 which is in a different physical memory bank from the portion of data associated with virtual address 21 based on the mapping table 320. Master 2 accesses the portion of data associated with virtual address 13 because it is not associated with the same physical memory bank as the portion of data associated with virtual address 21 or the portion of data associated with virtual address 12 based on the mapping table 320.

This process may continue until the master completes its accesses. The mapping table maps the address in virtual memory associated with portions of data to addresses of different memory banks to provide for a higher throughput and lower latency compared to if the data accessed by each master was in a same memory bank. If the access was in the same memory bank, then Master 1 would only be able to burst access two blocks based on its maximum access. The arbitrator 106 may then allow Master 2 and then Master 3 to burst access before allowing Master 1 to complete its burst access. This may result in Master 1 access taking 13 clock cycles to access data compared to the 5 cycles in the example.

Figure 4:
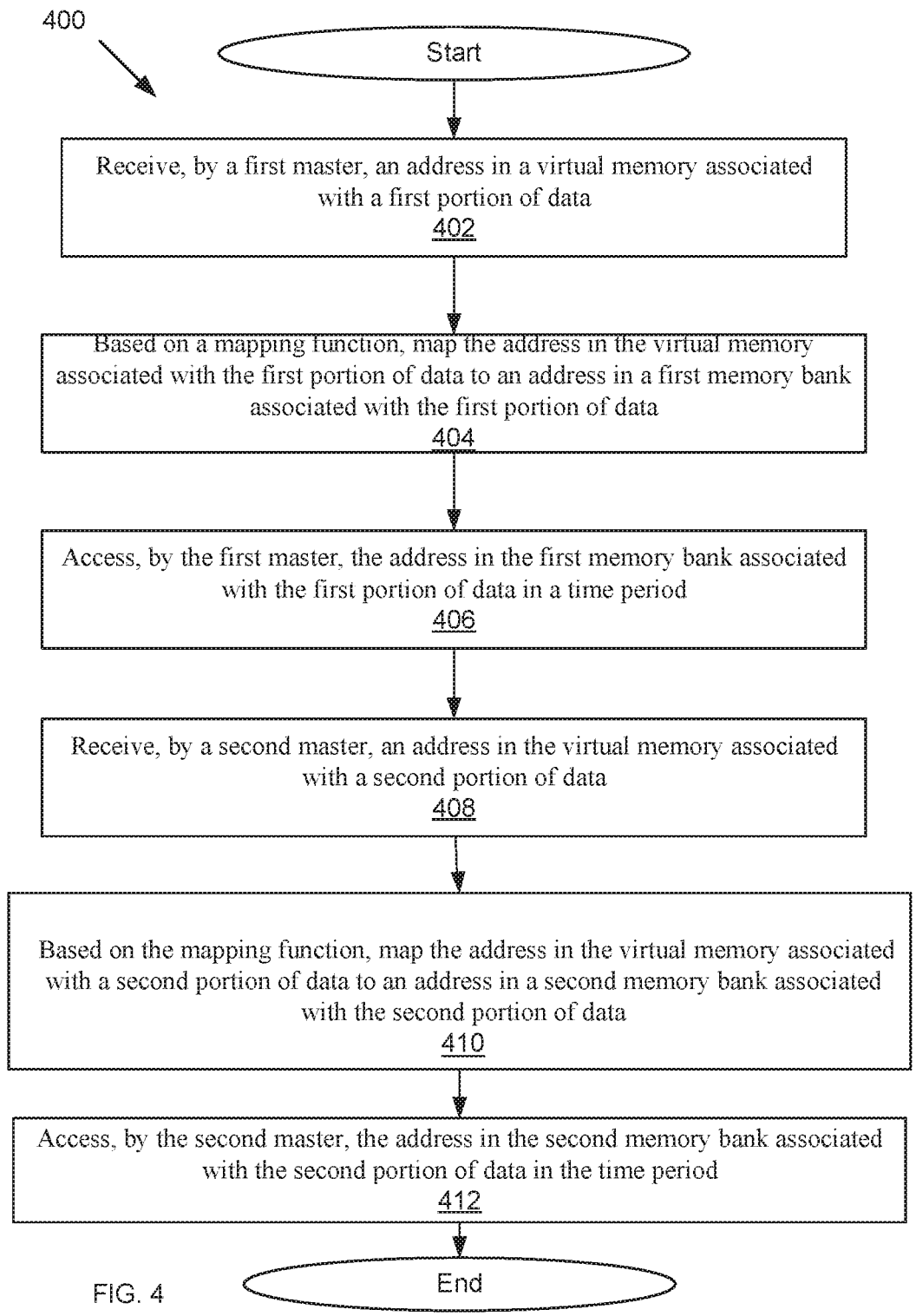
FIG. 4 is a flow chart of functions associated with access by the masters to the memory banks by mapping addresses in the virtual memory to addresses of the memory banks in the example storage system.

FIG. 4 is a flow chart 400 of functions associated with spreading access by the masters to the plurality of memory banks 102. In an example, the functions may be performed by the storage system 100 in the FIG. 1 example. The functions start at 402 and proceed to 412.

At 402, an address in a virtual memory associated with a first portion of data is received by a first master. The first master may need to read the first portion of data or write the first portion of data. In examples, the storage system 100 may be part of a larger system such as a computing system, a networking device, or a storage enclosure or specifically personal computers, servers, mainframes, smartphones, gaming systems, set top boxes, communication equipment, etc. The first master may receive the address from a sub-system in the larger system.

At 404, the address in the virtual memory associated with the first portion of data is mapped to an address in a first memory bank associated with the first portion of data. The first memory bank may be a physical single port memory. The addresses may be mapped using a mapping function of the first master defined by the access spreader 108 so that the master will then be able to successfully access the first memory bank for a read or write operation. The mapping function may take the form of a hash function, a logical operation, or a mapping table, among others.

At 406, the first master accesses the address in the first memory bank associated with the first portion of data in a time period. The access may be to read of the portion of data in the address of the memory bank or a write the portion of data to the address of the memory bank. In examples, the time period may be a clock cycle.

At 408, an address in the virtual memory associated with a second portion of data is received by a second master. The second master may need to read the second portion of data or write the second portion of data. The second master may receive the address from a sub-system in the larger system.

At 410, the address in the virtual memory associated with a second portion of data is mapped to an address in a second memory bank associated with the second portion of data. The second memory bank may be a physical single port memory separate from the first memory bank. The addresses may be mapped using the mapping function of the second master defined by the access spreader 108 so that the second master will be able to successfully access the second memory bank for a read or write operation. The mapping function may be the same as used by the first master. In some examples, the mapping function may be shared between the first master and second master such as in a shared memory which access spreader 108 accesses.

At 412, the second master accesses the address in the second memory bank associated with the second portion of data in the time period. The access may be to read the portion of data in the address of the memory bank or a write the portion of data to the address of the memory bank. In examples, the access by the second master and the access by the first master may be concurrent, e.g., in a same clock cycle.

In examples, the accesses may be spread over the memory banks based on the mapping function so that portions of data may be accessed by the plurality of masters with a high throughput and low latency and collisions between masters is reduced. The spreading may be uniform over the memory banks or non-uniform over the memory banks depending on the accesses.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for accessing memory in a data storage system, the method comprising:
 receiving at a first master circuit a first virtual address, the first virtual address corresponding, according to a mapping function, to a first physical address of a first physical memory bank which is to be accessed by the first master circuit;
implementing the mapping function at the first master circuit to spread memory access by the first master circuit across a plurality or physical memory banks, wherein the plurality of physical memory banks include the first physical memory bank and a second physical memory bank;
accessing by the first master circuit the first physical memory bank at the first physical address to perform
a first read operation to read a first portion of data stored in the first physical memory bank at the first physical address, or
a first write operation to write the first portion of the data to the first physical memory bank at the first physical address;
receiving at a second master circuit separate from the first master circuit a second virtual address, the second virtual address corresponding, according to the mapping function, to a second physical address of the second physical memory bank which is to be accessed by the second master circuit;
implementing the mapping function at the second master circuit to spread memory access by the second master circuit across the plurality memory banks; and
concurrently with access by the first master circuit to the first physical memory bank at the first physical address, accessing; by the second master circuit the second physical memory bank at the second physical address to perform
a second read operation to read a second portion of the data stored in the second physical memory bank at the second physical address, or
a second write operation to write the second portion of the data to the second physical memory bank at the second physical address.

2. The method of claim 1, wherein the mapping function;
maps the first virtual address to the first physical address; and
maps the second virtual address the second physical address.

3. The method of claim 1, wherein:
the first virtual address the second virtual address are associated with consecutive rows in a virtual memory; and
the first physical address and the second physical address identify consecutive memory banks.

4. The method of claim 1, wherein:
the mapping function maps the first virtual address to the first physical address based on a logical exclusive OR (XOR) operation on bits of the first virtual address; and
an output of the logical XOR operation identifies the first physical memory bank.

5. The method of claim 4, wherein:
the data includes 32 bytes;
the first virtual address includes 23 bits, which are represented by a variable address, where bit 22 of the 23 bits is a most significant bit and bit 0 of the 23 bits is a least significant bit; and
the logical XOR operation includes bits 12 to 9 of the variable address being XORed with bits 8 to 5 of the variable address to identify the first physical memory bank.

6. The method of claim 1, further comprising arbitrating access by the first master circuit and the second master circuit to one of the plurality of physical memory banks.

7. The method of claim 1, wherein the first physical memory bank and the second physical memory bank are each single port memory banks.

8. The method of claim 1, wherein:
the mapping function includes use of a mapping table to map virtual addresses of a virtual memory to physical addresses of the plurality of physical memory banks; and
the mapping table is shared by the first master circuit and the second master circuit.

9. The method of claim 1, wherein the concurrent access by the first master circuit and the second master circuit is within a single clock cycle.

10. The method of claim 1, wherein the first master circuit and the second master circuit are implemented as respective integrated circuits.

11. The method of claim 1, wherein the first master circuit and the second master circuit are implemented as a single integrated circuit.

12. The method of claim 1, wherein the first master circuit, the second master circuit and the plurality of physical memory banks are implemented as a single integrated circuit.

13. The method of claim 1, wherein:
the access by the first master circuit and the second master circuit to the plurality of physical memory banks is via a bus; and
the bus is directly connected to the first master circuit, the second master circuit and the plurality of physical memory banks.

14. A storage system comprising:
a plurality of physical memory banks comprising a first physical memory bank and a second physical memory bank;
a first master circuit configured to
receive a first virtual address corresponding, according to a mapping function, to a first physical address of the first physical memory bank which is to be accessed by the first master circuit,
implement the mapping function to spread memory access by the first master circuit across the plurality of physical memory banks, and
access the first physical memory bank at the first address to perform
a first read operation to read a first portion of data stored in the first physical memory bank at the first physical address, or
a first write operation to write the first portion of the data to the first physical memory bank at the first physical address; and
a second master circuit separate from the first master circuit and configured to
receive a second virtual address corresponding, according to the mapping function, to a second physical address of the second physical memory bank which is to be accessed by the second master circuit,
implement the mapping function to spread memory access by the second master circuit across the plurality of physical memory banks, and
concurrently with access by the first master circuit to the first physical memory bank at the first physical address, access the second physical memory bank at the second physical address to perform
a second read operation to read a second portion of the data stored in the second physical memory bank at the second physical address, or a second write operation to write the second portion of the data to the second physical memory bank at the second physical address.

15. The storage system of claim 14, wherein a virtual memory of the first virtual address and the second virtual address and the plurality of memory banks are configured with contiguous addresses.

16. The storage system of claim 14, wherein:
the first virtual address and the second virtual address are associated with consecutive rows in a virtual memory; and
the first physical address and the second physical address accessed are associated with consecutive physical memory banks.

17. The storage system of claim 14, wherein:
the first master circuit is configured to map the first virtual address to the first physical address based on a logical exclusive OR (XOR) operation on bits of the first virtual address; and
an output of the logical XOR operation identifies the first physical memory bank.

18. The storage system of claim 17, wherein:
the data includes 32 bytes;
the first virtual address includes 23 bits, which are represented by a variable address, where bit 22 of the 23 bits is a most significant bit and bit 0 of the 23 bits is a least significant bit; and
the logical XOR operation includes bits 12 to 9 of the variable address being XORed with bits 8 to 5 of the variable address to identify the first physical memory bank.

19. The storage system of claim 14, wherein the first master circuit is configured to access the first physical address and the second master circuit is configured to access the second physical address concurrently in a single clock cycle.

20. The storage system of claim 14, further comprising an arbitrator configured to arbitrate access to one of the plurality of physical memory banks.

21. The storage system of claim 14, wherein the first physical memory bank and the second physical memory bank are single port memory banks.

22. The storage system of claim 14, wherein:
the mapping function includes use of a mapping table to map virtual addresses of virtual memory to physical addresses of the plurality of physical memory banks; and
the mapping table is shared by the first master circuit and the second master circuit.

23. The storage system of claim 14, wherein:
the first master circuit is configured, during implementation of the mapping function, to map a first plurality of virtual addresses to a first plurality of physical addresses such that memory access by the first master circuit is uniformly spread across the plurality of physical memory banks; and
the second master circuit is configured, during implementation of the mapping function, to map a second plurality of virtual addresses to a second plurality of physical addresses such that memory access by the second master circuit is uniformly spread across the plurality of physical memory banks.

24. The storage system of claim 14, wherein:
the first master circuit is configured to directly access the plurality of physical memory banks; and
the second master circuit is configured to directly access the plurality of physical memory banks.

* * * * *